United States Patent
Werner et al.

(10) Patent No.: US 6,622,394 B2
(45) Date of Patent: Sep. 23, 2003

(54) BOARDWALK TRIANGLE-DECK SQUARE

(75) Inventors: Robert Werner, Howell, MI (US); David Beck, Jackson, MI (US); R. Scott Cook, Jackson, MI (US); Claude Brown, Jr., Jackson, MI (US); Rick Morse, Grass Lake, MI (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 09/982,568

(22) Filed: Oct. 17, 2001

(65) Prior Publication Data

US 2003/0070310 A1 Apr. 17, 2003

(51) Int. Cl.[7] ................................................. B43L 7/027
(52) U.S. Cl. ........................................... 33/474; 33/526
(58) Field of Search ......................... 33/474, 429, 476, 33/481, 482, 613, 645, 1 N, 534, 479, 480, 527, 702, 704, 526

(56) References Cited

U.S. PATENT DOCUMENTS

| | | | | |
|---|---|---|---|---|
| 2,562,348 A | * | 7/1951 | Bowser, Jr. | 33/492 |
| 4,850,114 A | * | 7/1989 | Vockins | 33/613 |
| 4,955,142 A | * | 9/1990 | Rieck | 33/613 |
| 5,090,129 A | * | 2/1992 | Cunningham | 33/474 |
| 5,170,568 A | * | 12/1992 | Wright | 33/429 |
| 5,293,694 A | * | 3/1994 | Swindle | 33/481 |
| 5,813,126 A | * | 9/1998 | Dahl | 33/474 |
| 6,243,961 B1 | * | 6/2001 | Winski | 33/474 |
| 6,314,652 B1 | * | 11/2001 | English | 33/481 |

* cited by examiner

Primary Examiner—Christopher W. Fulton
(74) Attorney, Agent, or Firm—Duane Morris LLP

(57) ABSTRACT

A multipurpose tool to facilitate installation of deck construction includes a main body portion having at least one structural feature that defines a plane. At least one flange is coupled to the main body portion and is oriented substantially perpendicular to the plane. The flange may be used to maintain consistent spacing between decking planks during assembly. The tool also may be used to strike lines, space fasteners, maintain baluster spacing, identify distances and angles, and indicate levels.

27 Claims, 4 Drawing Sheets

BOARDWALK TRIANGLE-DECK SQUARE

FIELD OF THE INVENTION

The invention generally relates to construction, and, more particularly, relates to a tool to facilitate the installation of decking planks and accessories.

BACKGROUND OF THE INVENTION

In a typical plank deck assembly, decking planks are mounted to a deck frame in uniformly spaced apart relationship in order to allow surface water or rain to pass through the deck as well as to aid in ventilation. The spacing selected for use between the deck planks may vary depending on the type of materials used in construction as well as anticipated environmental conditions.

Deck builders employ various implements to maintain uniformity in deck plank spacing, including wooden spacers, nails or specially made jigs. Wooden spacers, while inexpensive to manufacture, are subject to swelling and shrinking depending on the presence of moisture and, therefore, may not consistently provide uniform spacing. Further, wooden spacers are subject to fracture, splintering and other wear conditions, making them unsuitable for long term or extensive use. Non-wooden implements such as nails are frequently used as spacers to maintain uniform plank spacing; however, nails may be difficult to use, in part, because they have a tendency to fall between the decking planks, while the planks are maneuvered into position. In addition to the foregoing drawbacks, wooden spacers, nails and other known implements are typically limited to providing a single spacing width. In consequence, building contractors may be required to either carry an assortment of differently sized spacers, or to construct one or more customized spacers at each job site. Finally, currently used spacers may have coefficients of thermal expansion (CTEs) that differ from the CTEs of deck planking materials. Such CTE variations lead to inconsistent plank spacings.

There is therefore a need to provide an inexpensive, durable, multipurpose tool useful for constructing decks. The preferred tool would be made of a material having a CTE that generally corresponds to the CTE of decking materials being assembled to ensure uniform spacing. In addition, the preferred tool would serve a variety of functions, including, but not limited to, use as a protractor, a measuring device, a spacer useful for a plurality of gap sizes, a saw guide and a leveling device.

SUMMARY OF THE INVENTION

The invention provides a tool that is useful for installing decking planks, balusters and accessories. The tool is configured to provide several distinct functions, which include, but are not limited to, defining angles and distances, ensuring accurate and consistent spacing of decking planks and balusters, leveling structural members, and spacing fasteners.

According to one aspect of the invention, a tool to facilitate installation of decking planks includes a main body portion having at least one structural feature that defines a plane. At least one flange is coupled to the main body portion and is oriented substantially perpendicular to the plane. The tool further includes: means for mounting at least one leveling vial on the tool, means for defining an angle; and means for defining a distance.

According to another inventive aspect a tool to facilitate installation of decking planks includes a substantially planar main body portion, and a pair of oppositely extending flanges coupled to the main body portion, wherein the flanges oriented substantially perpendicular to the planar surface.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION OF THE PREFERRED EMBODIMENTS

Figure 1:
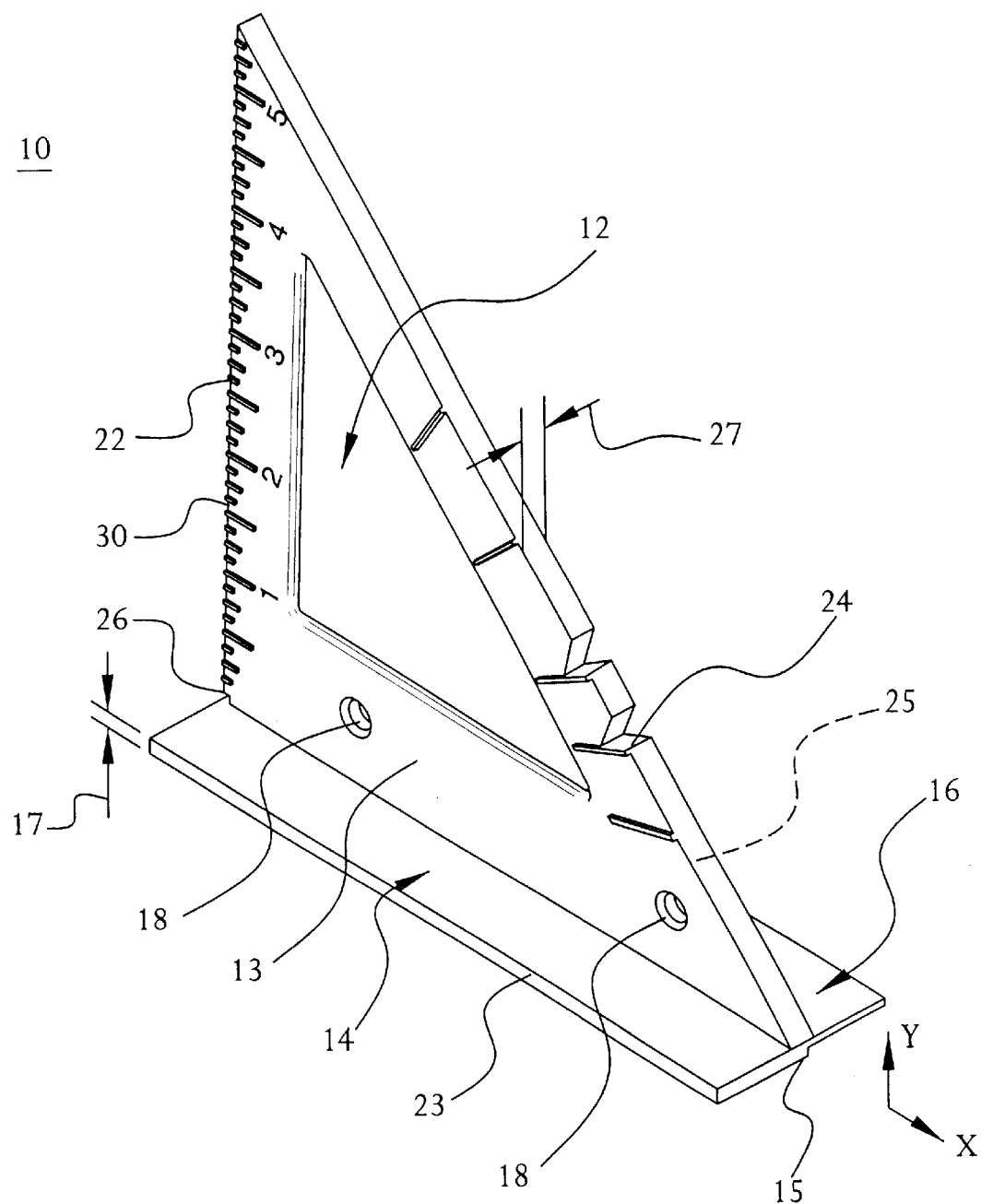
FIG. 1 is an isometric view of a tool in accordance with the invention.
Figure 2:
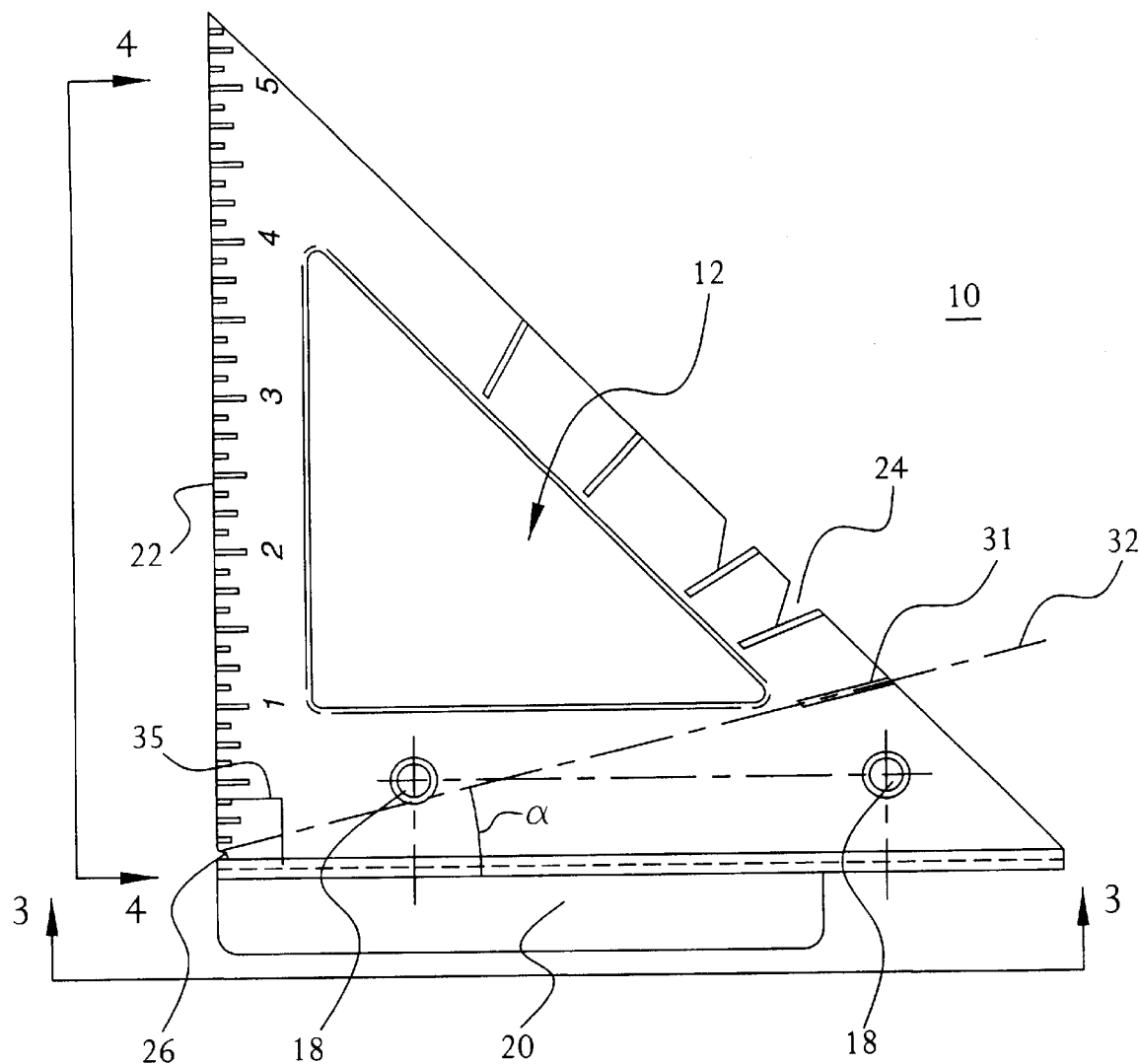
FIG. 2 is a top plan view of the tool shown in FIG. 1.
Figure 3:
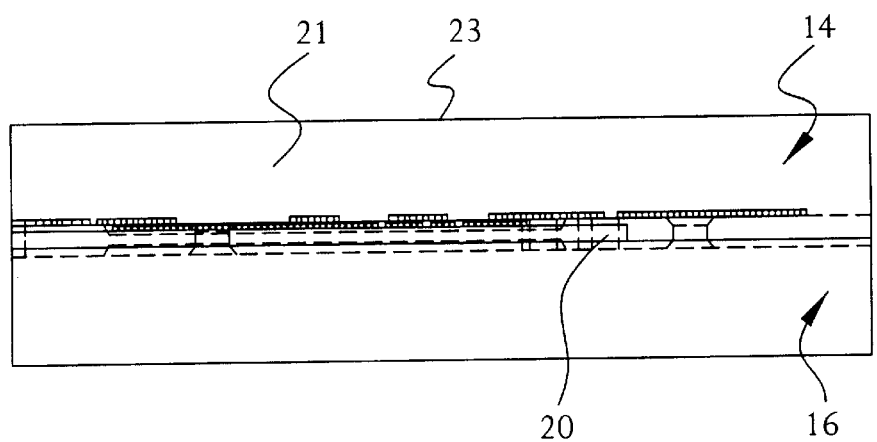
FIG. 3 is side elevation view of the tool shown in FIG. 2 taken along line 3—3.
Figure 4:
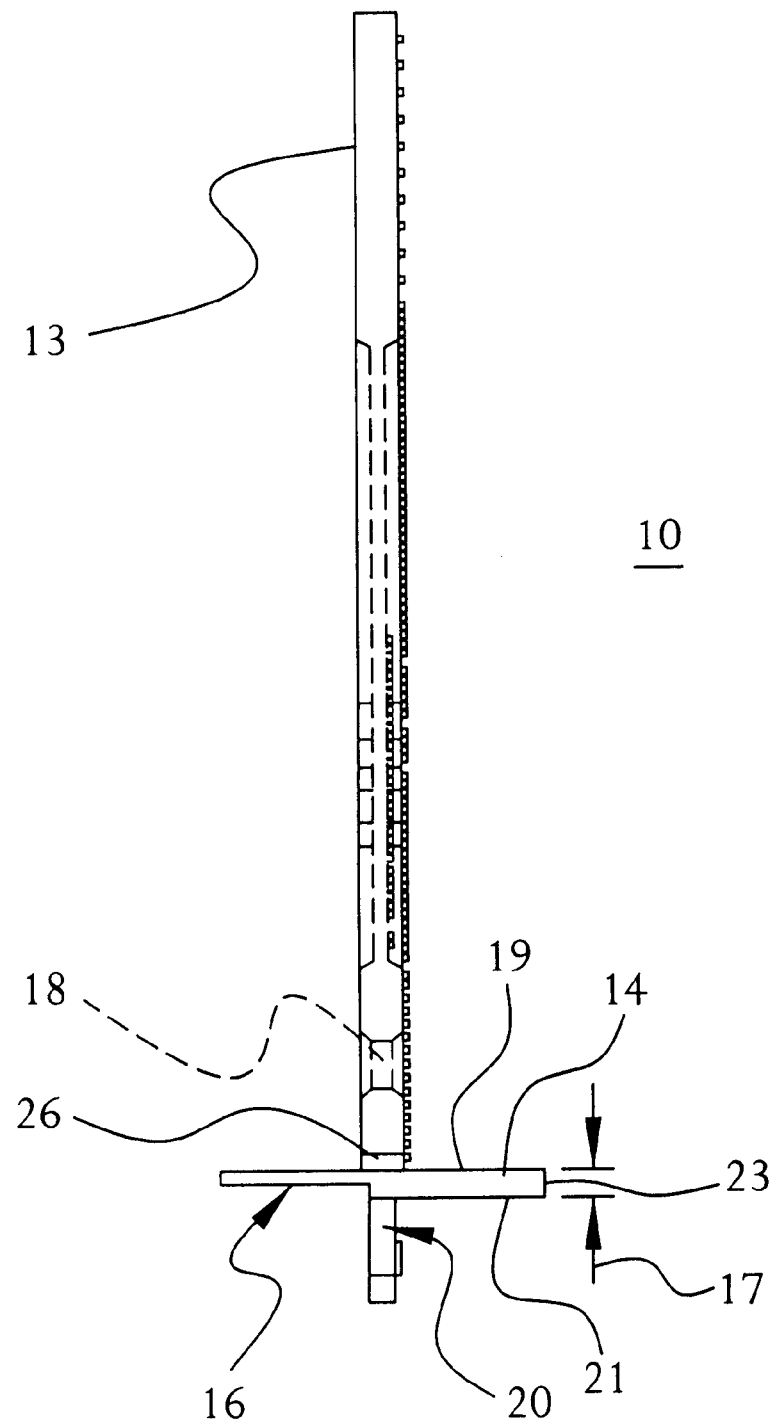
FIG. 4 is a side elevation view of the tool shown in FIG. 2 taken along the 4—4.

Referring to FIG. 1, a multipurpose tool 10 in accordance with the invention is a unitary device having a main body portion 12, which includes structural features defining one or more alignment planes. In the embodiment shown in FIG. 1, the tool is triangular in shape, although the tool shape is not limited thereto, but may comprise any conceivable geometric configuration. The tool defines a first alignment plane, which is shown in FIG. 1 as the plane defined by x and y axes. In the embodiment shown, the x-y alignment plane is defined by a continuous planar surface 13, although it will be understood by those skilled in the art that alignment planes also may be defined by a plurality of discrete three-dimensional structural features that together define a plane. It is further contemplated that multiple alignment planes may be provided in a single tool 10. The tool 10 is preferably made of a thermally sensitive polymeric material having a coefficient of thermal expansion (CTE) that approximates the CTE of the materials being assembled.

Figure 5:
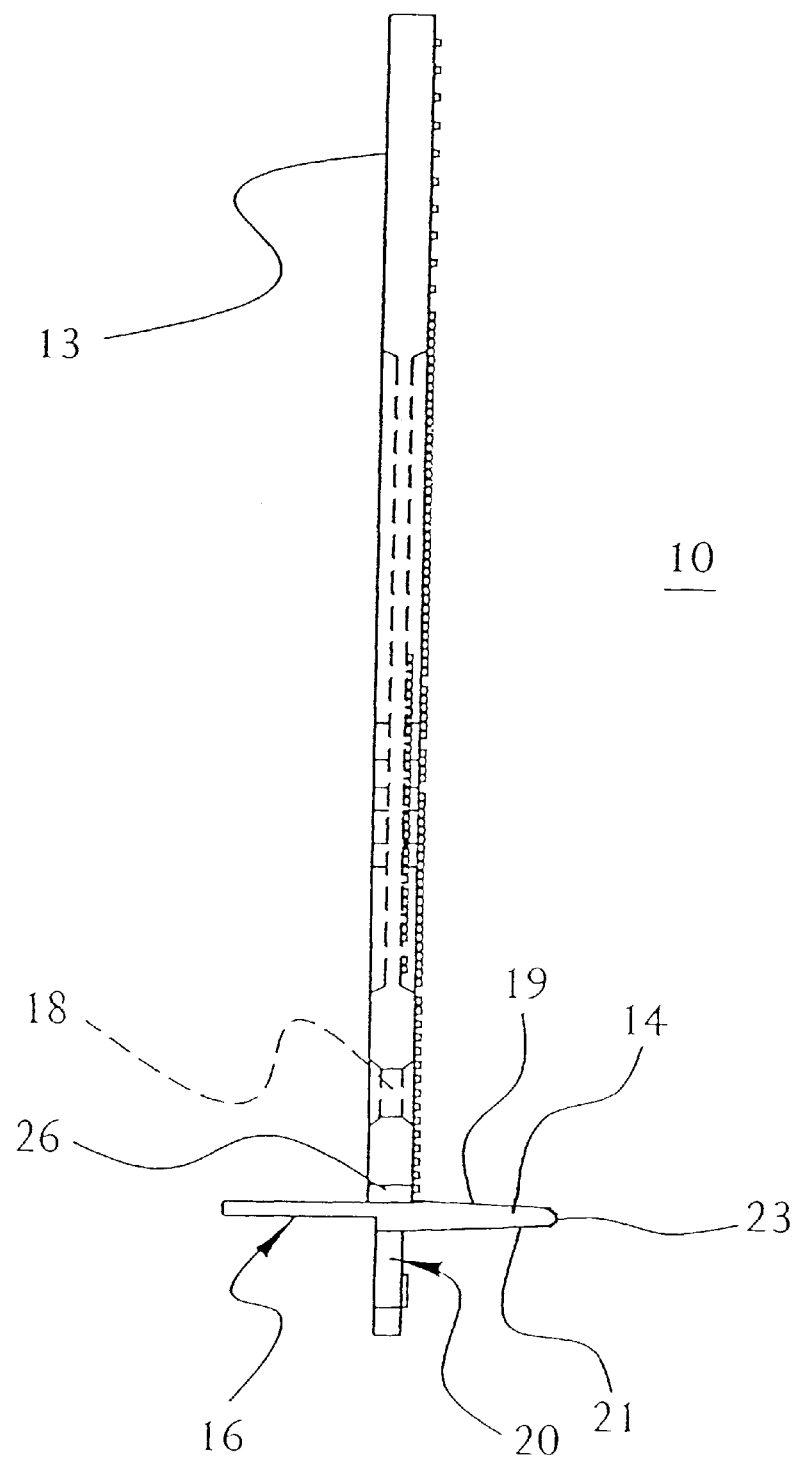
FIG. 5 is a side elevation view according to another embodiment.

A first spacer flange 14 extends from the main body portion 12 in a direction, which is substantially perpendicular to the x-y alignment plane. The flange 14 is configured to fit between successive pair of decking planks to ensure consistent gapping. In the embodiment shown, the flange 14 extends from an edge 15 of the tool 12 and is coextensive therewith. The flange has a predetermined thickness 17 which is selected in consideration of the decking plank material (or other material) being assembled to provide the desired spacing between planks. The sidewalls 19, 21 of flange 14 may be tapered to facilitate insertion of the flange 14 between planks, as shown in FIG. 5. Similarly, the free longitudinal edge 23 of flange 14 may be beveled to improve insertability, as shown in FIG. 5.

A second spacer flange 16 is integrally formed with the main body portion 12 of tool 10 and extends from the main body portion 12 in a direction substantially opposite the first flange 14 along tool edge 15. The second flange 16 is oriented substantially perpendicular to a second alignment plane, which is defined by a surface 25 of main body 12. In the embodiment shown, the first and second alignment planes 13, 25 are parallel planes which are spaced apart by a distance equal to the thickness 27 of the main body portion 12 of the tool 10. The second spacer flange similarly may be formed with tapered sidewalls and a beveled longitudinal free edge.

A pair of mounting holes 18 are provided on main body portion 12. The mounting holes extend through the main body portion 12 in a direction substantially perpendicular to planar surfaces 13 and 25. The mounting holes permit 18 ganging of two or more tools 10, on a single plank, for example, thereby facilitating the uniform spacing of long planks.

A straight edge 22 of the tool body is provided with indicia 30, along a length thereof such that the tool may be used to define distances, in a manner similar to a ruler. In the embodiment shown, the indicia comprise a series of parallel spaced apart straight line marking each of which has a corresponding distance associated therewith with reference to a point of origin. Indicia 30 may also include, but are not limited to, dots, protuberances, indentations, notches holes, electronic sensors and photonic sensors.

Tool 10 further includes means for defining angles, which include indicia 31 provided on the tool body 12, each of which, in combination with point of origin 26, define a line 32. In the embodiment shown, the indicia consist of lines and notches provided along an edge of the tool body 12 that is opposite the right angle defined by first and second edges 15, 22, of tool 10. The line 32 forms an angle (alpha) with reference to the straight edge 15 of the tool body 12. Indicia 31 may include, but are not limited to lines, dots, protuberances, indentations, notches holes, electronic sensors and photonic sensors. Further, it will be understood that while it may be preferable to employ one or more edges of the tool body 12 to define angles, it is not necessary. Alternatively, angles may be defined by a pair of lines or by at least three spaced apart indica, which, define lines that intersect at corresponding angles.

Tool 10 includes a spacer 20, of predetermined length, useful for, but not limited to, spacing balusters in a deck assembly. The baluster spacer 20 is provided along an edge 15 of tool body 12 and extends generally in the plane of the tool body 12. It will be understood however, that the baluster spacer 20 may extend in planes other than the plane of tool body 12 without impairing the function of the baluster spacer 20 or the tool 10.

Tool 10 may be used to perform several functions, useful in construction, and, in particular, in building decks. In a first mode of operation, tool 10 may be used to space decking planks, by placing the tool 10 on the surface a decking plank so that the spacing flange 14 of the tool 10 extends downward from the surface of the decking plank and a first sidewall of the flange abuts a mating edge of the plank. A second plank is positioned next to the first plank such that a mating edge of the second plank abuts a sidewall of the flange opposite the first sidewall. Once the planks are spaced by the flange, they may be secured in position by use of screws, nails, bolts, adhesive or some other fastening means. After securing the planks in position may be withdrawn to remove the spacing flange from between the planks. This process may be repeated as needed to install any number of planks.

In a second mode of operation, tool 10 may be used to define angles by placing the tool 10 on the surface of an object for which the determination of an angle in needed. The tool may be positioned such that the edge 15 of the tool is aligned with a baseline of the object from which an angle is to be determined. With the tool 10 held in position, a first mark or indicia is placed on the object at the point of origin 26 defined by the tool 10. A second mark is placed on the object at an indicia corresponding to the desired angle. The tool is then removed from the object to reveal the two indicia placed thereon. Next, a straight edge of the tool 10 may be used to strike a line through the two indicia, thereby denoting the position of the angle on the surface of the object. This feature is particularly useful in instances where mitered joints are required for decking materials.

In yet another mode of operation, tool 10 may be used to uniformly and consistently install spaced deck balusters. In this mode, the tool 10 is positioned with respect to a pair of adjacent balusters such that the baluster spacer 20, of predetermined length, extends between the balusters. The balusters are then abutted against the spacer 20 and secured into position. Once the balusters are secured, the tool 10 may be removed and the operation repeated until all the balusters are installed.

Other useful applications of tool 10, not specifically discussed herein, will be readily apparent to those skilled in the art.

A number advantages are achieved in accordance with the invention. The multipurpose tool 10 is lightweight and inexpensive to produce while at the same time providing a plethora of useful functions, a number of which are described herein. The tool 10 can be produced in any size or three dimensional shape as may be required for particular applications. Depending on the shape of the tool body selected, several flanges of varying size and thickness may be coupled to the tool 12 body for added versatility. Leveling vials may be secured to the tool 10 as needed, and the tool 10 may be provided with any number of indicia useful for measuring lengths and angles, striking lines or stenciling patterns. Finally, the tool 10 may be used as a cutting guide for ensuring straight cuts and providing mitered joints.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention

We claim:

1. A tool to facilitate installation of decking planks comprising:
    a main body portion forming a right angle and having a substantially planar surface;
    at least one spacing flange coupled to said main body portion, said flange oriented substantially perpendicular to said planar surface and having tapered sidewalls; and
    measuring means located on said tool.

2. The tool of claim 1 wherein the flange has a beveled longitudinal edge.

3. The tool of claim 1 wherein the tool comprises a thermally sensitive polymer.

4. The tool of claim 1 wherein the tool includes at least one mounting hole.

5. The tool of claim 1 wherein the main body of the tool forms a right triangle.

6. The tool of claim 1 wherein the tool includes at least one notch.

7. The tool of claim 1 wherein the tool is a unitary construction.

8. The tool of claim 1 wherein at least one leveling vial is engageable with said tool.

9. The tool of claim 1 wherein a spacer is provided along an edge of said tool body.

10. The tool of claim 1, wherein the measuring means includes means for defining an angle.

11. The tool of claim 10 wherein the means for defining an angle included two straight edges defining an angle of 90 degrees.

12. The tool of claim 10 wherein the means for defining an angle comprise two indicia defined on the tool, which are spaced apart from a point of origin defined on said tool, which together with the point of origin define an acute angle.

13. The tool of claim 12 wherein the tool includes first and second edges, and one of the indicia is provided on the first edge and the other indicia is provided on the second edge.

14. The tool of claim 12 wherein the indicia comprise at least one of a line, a dot, a protuberance, an indentation, a hole, electronic sensors, and photonic sensors.

15. The tool of claim 1, wherein the measuring means includes means for defining a distance.

16. The tool of claim 15 wherein the means for defining a distance includes a straight line having indicia thereon.

17. A tool to facilitate installation of decking planks comprising:

a substantially planar main body portion which forms a right angle;

a pair of oppositely extending spacer flanges coupled to said main body portion, said flanges oriented substantially perpendicular to said substantially planar main body portion, and having different thicknesses from one another; and measuring means located on said tool.

18. The tool of claim 17 wherein at least one of the flanges has a beveled longitudinal edge.

19. The tool of claim 17 wherein at least one of the flanges has tapered sidewalls.

20. The tool of claim 17 wherein the main body of the tool forms a right triangle.

21. The tool of claim 17 wherein the tool includes at least one notch.

22. The tool of claim 17 wherein the tool is a unitary construction.

23. The tool of claim 17 wherein said tool is engageable with at least one leveling vial.

24. The tool of claim 17 wherein a spacer is provided along an edge of said tool body.

25. A tool to facilitate installation of decking planks comprising:

a main body portion forming a right angle and having at least one structural feature that defines a plane;

at least one spacing flange coupled to said main body portion, said flange oriented substantially perpendicular to said plane and having a beveled longitudinal edge; and measuring means located on said tool.

26. The tool of claim 25 further comprising means for coupling at least two tools together.

27. The tool of claim 26 wherein the means for coupling at least two tools together is at least one mounting hole provided in said tool.

* * * * *